(12) United States Patent
Durdik et al.

(10) Patent No.: US 8,990,251 B2
(45) Date of Patent: *Mar. 24, 2015

(54) TECHNIQUES FOR CHANGING PERCEIVABLE STIMULI ASSOCIATED WITH A USER INTERFAVE FOR AN ON-DEMAND DATABASE SERVICE

(71) Applicant: Salesforce.com, Inc., San Francisco, CA (US)

(72) Inventors: Paul Durdik, Foster City, CA (US); Daryl Josephson, San Carlos, CA (US)

(73) Assignee: Salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/633,756

(22) Filed: Oct. 2, 2012

(65) Prior Publication Data

US 2013/0031134 A1 Jan. 31, 2013

Related U.S. Application Data

(62) Division of application No. 12/369,710, filed on Feb. 11, 2009, now Pat. No. 8,296,321.

(51) Int. Cl.
*G06F 17/30* (2006.01)

(52) U.S. Cl.
CPC .................. *G06F 17/30522* (2013.01)
USPC ............................ 707/781; 707/783; 707/785

(58) Field of Classification Search
USPC .................................................. 707/781–786
See application file for complete search history.

(56) References Cited

U.S. PATENT DOCUMENTS

| | | |
|---|---|---|
| 5,072,370 A | 12/1991 | Durdik et al. |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,787,437 A | 7/1998 | Potterveld et al. |
| 5,794,232 A | 8/1998 | Mahlum et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,941,947 A | 8/1999 | Brown et al. |
| 5,950,190 A | 9/1999 | Yeager et al. |
| 5,963,953 A | 10/1999 | Cram et al. |
| 5,974,409 A | 10/1999 | Sanu et al. |

(Continued)

OTHER PUBLICATIONS

Push Technology, Oct. 17, 2008. Wikipedia. Feb. 26, 2010, 4 pages, <http://en.wikipedia.org/wiki/Push_technology>.

(Continued)

*Primary Examiner* — Hanh Thai
(74) *Attorney, Agent, or Firm* — Blakely, Sokoloff, Taylor & Zafman

(57) ABSTRACT

In accordance with embodiments, there are provided techniques for providing perceivable stimuli in an interface of a multi-tenant on-demand database system. These techniques for providing perceivable stimuli facilitate collaborative efforts of groups of users of a multi-tenant on-demand database system while maintaining access constraints amongst users associated with a common tenant.

20 Claims, 6 Drawing Sheets

(56) References Cited

U.S. PATENT DOCUMENTS

| | | | |
|---|---|---|---|
| 5,987,471 A | 11/1999 | Bodine et al. | |
| 6,064,656 A | 5/2000 | Angal et al. | |
| 6,085,191 A | 7/2000 | Fisher et al. | |
| 6,092,083 A | 7/2000 | Brodersen et al. | |
| 6,112,198 A | 8/2000 | Lohman et al. | |
| 6,169,534 B1 | 1/2001 | Raffel et al. | |
| 6,178,425 B1 | 1/2001 | Brodersen et al. | |
| 6,189,000 B1 | 2/2001 | Gwertzman et al. | |
| 6,189,011 B1 | 2/2001 | Lim et al. | |
| 6,216,135 B1 | 4/2001 | Brodersen et al. | |
| 6,219,667 B1 | 4/2001 | Lu et al. | |
| 6,226,641 B1 | 5/2001 | Hickson et al. | |
| 6,233,617 B1 | 5/2001 | Rothwein et al. | |
| 6,233,618 B1 | 5/2001 | Shannon | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,330,560 B1 | 12/2001 | Harrison et al. | |
| 6,336,137 B1 | 1/2002 | Lee et al. | |
| 6,341,288 B1 | 1/2002 | Yach et al. | |
| 6,345,288 B1 | 2/2002 | Reed et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,438,562 B1 | 8/2002 | Gupta et al. | |
| 6,446,089 B1 | 9/2002 | Brodersen et al. | |
| 6,446,109 B2 | 9/2002 | Gupta | |
| 6,453,038 B1 | 9/2002 | McFarlane et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,578,037 B1 | 6/2003 | Wong et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,148 B1 | 8/2003 | Salo et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,658,417 B1 | 12/2003 | Stakutis et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,721,765 B2 | 4/2004 | Ghosh et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,775,291 B1 * | 8/2004 | Ryu et al. | 370/401 |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,839,608 B2 | 1/2005 | Sarabi et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,944,133 B2 | 9/2005 | Wisner et al. | |
| 6,947,927 B2 | 9/2005 | Chaudhuri et al. | |
| 7,076,633 B2 | 7/2006 | Tormasov et al. | |
| 7,152,109 B2 | 12/2006 | Suorsa et al. | |
| 7,174,483 B2 | 2/2007 | Becher et al. | |
| 7,177,897 B2 * | 2/2007 | Manukyan | 709/200 |
| 7,185,192 B1 | 2/2007 | Kahn | |
| 7,206,805 B1 | 4/2007 | McLaughlin, Jr. | |
| 7,206,807 B2 | 4/2007 | Cheenath | |
| 7,209,929 B2 | 4/2007 | Dominguez, Jr. et al. | |
| 7,249,118 B2 | 7/2007 | Sandler et al. | |
| 7,305,577 B2 | 12/2007 | Zhang | |
| 7,308,704 B2 | 12/2007 | Vogel et al. | |
| 7,340,411 B2 | 3/2008 | Cook | |
| 7,350,237 B2 | 3/2008 | Vogel et al. | |
| 7,373,364 B1 | 5/2008 | Chapman | |
| 7,448,079 B2 | 11/2008 | Tremain | |
| 7,484,219 B2 | 1/2009 | Mitra | |
| 7,529,728 B2 | 5/2009 | Weissman et al. | |
| 7,577,092 B2 | 8/2009 | San Andres et al. | |
| 7,580,975 B2 | 8/2009 | Cheenath | |
| 7,584,300 B2 * | 9/2009 | Fukuzato | 709/240 |
| 7,599,953 B2 | 10/2009 | Galindo-Legaria et al. | |
| 7,620,655 B2 | 11/2009 | Larsson et al. | |
| 7,630,986 B1 * | 12/2009 | Herz et al. | 1/1 |
| 7,693,820 B2 | 4/2010 | Larson et al. | |
| 7,814,470 B2 | 10/2010 | Mamou et al. | |
| 7,849,401 B2 | 12/2010 | Elza et al. | |
| 8,078,597 B2 * | 12/2011 | Polk et al. | 707/705 |
| 8,095,607 B2 | 1/2012 | Shenfield | |
| 8,244,759 B2 | 8/2012 | Brooks et al. | |
| 8,473,518 B1 * | 6/2013 | Yancey et al. | 707/786 |
| 2001/0023440 A1 | 9/2001 | Franklin et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0133392 A1 | 9/2002 | Angel et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015578 A1 | 1/2004 | Karakashian et al. | |
| 2004/0015981 A1 | 1/2004 | Coker et al. | |
| 2004/0027388 A1 | 2/2004 | Berg et al. | |
| 2004/0044656 A1 | 3/2004 | Cheenath | |
| 2004/0045004 A1 | 3/2004 | Cheenath | |
| 2004/0059420 A1 | 3/2004 | Michelson | |
| 2004/0064503 A1 | 4/2004 | Karakashian et al. | |
| 2004/0111410 A1 | 6/2004 | Burgoon et al. | |
| 2004/0128001 A1 | 7/2004 | Levin et al. | |
| 2004/0143645 A1 | 7/2004 | Cheenath | |

(56) References Cited

U.S. PATENT DOCUMENTS

| | | | |
|---|---|---|---|
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0220952 A1 | 11/2004 | Cheenath | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0144048 A1* | 6/2005 | Belanger et al. | 705/5 |
| 2005/0165859 A1* | 7/2005 | Geyer et al. | 707/201 |
| 2005/0223022 A1 | 10/2005 | Weissman et al. | |
| 2005/0264417 A1* | 12/2005 | Miller et al. | 340/539.13 |
| 2005/0283478 A1 | 12/2005 | Choi et al. | |
| 2006/0095960 A1 | 5/2006 | Arregoces et al. | |
| 2006/0100912 A1 | 5/2006 | Kumar et al. | |
| 2006/0136382 A1 | 6/2006 | Dettinger et al. | |
| 2006/0206834 A1 | 9/2006 | Fisher et al. | |
| 2006/0235714 A1 | 10/2006 | Adinolfi et al. | |
| 2006/0235715 A1 | 10/2006 | Abrams et al. | |
| 2006/0235831 A1 | 10/2006 | Adinolfi et al. | |
| 2007/0078705 A1 | 4/2007 | Abels et al. | |
| 2007/0088741 A1 | 4/2007 | Brooks et al. | |
| 2007/0124276 A1* | 5/2007 | Weissman et al. | 707/2 |
| 2007/0130130 A1 | 6/2007 | Chan et al. | |
| 2007/0130137 A1 | 6/2007 | Oliver et al. | |
| 2007/0150303 A1 | 6/2007 | Cheenath | |
| 2007/0150546 A1 | 6/2007 | Karakashian et al. | |
| 2007/0226640 A1 | 9/2007 | Holbrook et al. | |
| 2008/0010243 A1 | 1/2008 | Weissman et al. | |
| 2008/0077566 A1 | 3/2008 | Fell et al. | |
| 2008/0082540 A1 | 4/2008 | Weissman et al. | |
| 2008/0082555 A1 | 4/2008 | Salmon et al. | |
| 2008/0082572 A1 | 4/2008 | Ballard et al. | |
| 2008/0082986 A1 | 4/2008 | Cheenath et al. | |
| 2008/0086358 A1 | 4/2008 | Doshi et al. | |
| 2008/0086447 A1 | 4/2008 | Weissman et al. | |
| 2008/0086479 A1 | 4/2008 | Fry et al. | |
| 2008/0086482 A1 | 4/2008 | Weissman | |
| 2008/0086514 A1 | 4/2008 | Weissman et al. | |
| 2008/0086567 A1 | 4/2008 | Langen et al. | |
| 2008/0086735 A1 | 4/2008 | Cheenath et al. | |
| 2008/0091682 A1* | 4/2008 | Lim | 707/9 |
| 2008/0126333 A1 | 5/2008 | Bezar et al. | |
| 2008/0155310 A1 | 6/2008 | Langen et al. | |
| 2008/0162544 A1 | 7/2008 | Weissman et al. | |
| 2008/0201701 A1 | 8/2008 | Hofhansl et al. | |
| 2008/0215560 A1 | 9/2008 | Bell et al. | |
| 2008/0270354 A1 | 10/2008 | Weissman | |
| 2008/0270987 A1 | 10/2008 | Weissman | |
| 2008/0275884 A1 | 11/2008 | Yoshida et al. | |
| 2009/0013011 A1 | 1/2009 | Barker et al. | |
| 2009/0024609 A1 | 1/2009 | Barker et al. | |
| 2009/0024673 A1 | 1/2009 | Barker et al. | |
| 2009/0030906 A1 | 1/2009 | Doshi et al. | |
| 2009/0049053 A1 | 2/2009 | Barker et al. | |
| 2009/0049065 A1 | 2/2009 | Weissman | |
| 2009/0049101 A1 | 2/2009 | Weissman | |
| 2009/0049102 A1 | 2/2009 | Weissman | |
| 2009/0049288 A1 | 2/2009 | Weissman | |
| 2009/0164915 A1 | 6/2009 | Gasn et al. | |
| 2009/0276395 A1 | 11/2009 | Weissman et al. | |
| 2009/0276405 A1 | 11/2009 | Weissman et al. | |
| 2009/0282045 A1 | 11/2009 | Hsieh et al. | |
| 2009/0319529 A1 | 12/2009 | Bartlett et al. | |
| 2010/0070323 A1* | 3/2010 | Polcari et al. | 705/8 |
| 2010/0191719 A1 | 7/2010 | Weissman et al. | |
| 2010/0211619 A1 | 8/2010 | Weissman et al. | |
| 2010/0235837 A1 | 9/2010 | Weissman et al. | |
| 2010/0274779 A1 | 10/2010 | Weissman et al. | |
| 2011/0078213 A1 | 3/2011 | Bezar et al. | |
| 2011/0234482 A1 | 9/2011 | Tanaka | |
| 2011/0238736 A1 | 9/2011 | Tanaka | |
| 2011/0276535 A1 | 11/2011 | Pin et al. | |
| 2011/0276580 A1 | 11/2011 | Press et al. | |
| 2011/0276834 A1 | 11/2011 | Calahan et al. | |
| 2012/0011406 A1 | 1/2012 | Williams et al. | |
| 2012/0047489 A1 | 2/2012 | Varadharajan | |

OTHER PUBLICATIONS

Customer Relationship Management, Oct. 16, 2008. Wikipedia, downloaded on Feb. 26, 2010, 1 page, <http://en.wikipedia.org/wiki/Customer_Relationship_Management>.

Flat file database, Apr. 22, 2008. Wikipedia, downloaded on Feb. 26, 2010, 4 pages, <http://en.wikipedia.org/wiki/Flat_file_database>.

Relational database, Apr. 25, 2008. Wikipedia, downloaded on Feb. 26, 2010, 6 pages, <http://en.wikipedia.org/wiki/Relational_database>.

International Search Report and Written Opinion for Int'l Patent Application No. PCT/US2010/050021 mailed Dec. 28, 2010, 12 pgs.

Non-Final Office Action for U.S. Appl. No. 12/369,710 Mailed Dec. 23, 2010, 10 Pages.

Final Office Action for U.S. Appl. No. 12/369,710 Mailed Jun. 3, 2011, 10 Pages.

Non-Final Office Action for U.S. Appl. No. 12/639,710 Mailed Feb. 14, 2012, 11 Pages.

Notice of Allowance and Fees for U.S. Appl. No. 12/639,710 Mailed Jun. 26, 2012, 10 Pages.

First named inventor: Yancey, Scott, U.S. Appl. No. 12/636,658, filed Dec. 11, 2008, 36 pages.

First named inventor: Yancey, Scott, U.S. Appl. No. 12/636,675, filed Dec. 11, 2009, 28 pages.

First name inventor: Doshi, Kedar, U.S. Appl. No. 12/167,991, filed Jul. 3, 2008, 30 pages.

First name inventor: Yancey, Scott, U.S. Appl. No. 12/132,409, filed Jun. 3, 2008, 30 pages.

First name inventor: Yancey, Scott, U.S. Appl. No. 12/197,979, filed Aug. 25, 2008, 36 pages.

First name inventor: Durdik, Paul, U.S. Appl. No. 12/549,349, filed Aug. 27, 2009, 28 pages.

Lee, et al. "Composition of executable business process models by combining business rules and process flows," by Expert Systems With Application, Oxford, GB, vol. 33, No. 1, Dec. 22, 2006, 8 pages.

Mietzer, et al. "Combining Different Multi-tenancy Patterns in Service Oriented Applications," by IEEE International Enterprise Distributed Object Computing Conference, NJ, USA, dated Sep. 1, 2009, 10 pages.

Wang, et al. "Integrated Constraint Violation Handling for Dynamic Services Composition," by IEEE International Conference on Services Computing, NJ, USA, dated Sep. 21, 2009, 8 pages.

"A Study and Performance Evaluation of the Multi-Tenant Data Tier Design Patterns for Service Oriented Computing," by Wang et al, IEEE International Conference on E-Business Engineering, NJ, USA, dated Oct. 22, 2008, 4 pages.

"Using coordination contracts for flexible adaptation to changing business rules," by Wermelinger et al. dated Sep. 1, 2003, 3 pages.

* cited by examiner

TECHNIQUES FOR CHANGING PERCEIVABLE STIMULI ASSOCIATED WITH A USER INTERFAVE FOR AN ON-DEMAND DATABASE SERVICE

CLAIM OF PRIORITY

This divisional application is related to, and claims priority to, the non-provisional U.S. Utility patent application entitled "TECHNIQUES FOR CHANGING PERCEIVABLE STIMULI ASSOCIATED WITH A USER INTERFACE FOR AN ON-DEMAND DATABASE SERVICE," filed Feb. 11, 2009, having an application number of Ser. No. 12/369, 710 the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to databases. More particularly the current invention relates to techniques for dynamically changing perceivable stimuli associated with an interface in data communication with a multi-tenant database.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches that, in and of itself, may also be inventions. In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient retrieval of accurate information and subsequent delivery of this information to the user system has been and continues to be a goal of administrators of database systems.

Unfortunately, conventional database approaches might become inefficient if, for example, updating applications in the presence of complex data structures. A database system may also process a query relatively slowly if, for example, a relatively large number of users substantially concurrently access the database system.

Accordingly, it is desirable to provide techniques enabling an owner of the database system to improve the ease of use of the database system.

BRIEF SUMMARY

In accordance with embodiments, disclosed are techniques for providing perceivable stimuli in an interface of a multi-tenant on-demand database system. These techniques can enable embodiments to facilitate collaborative efforts of groups of users of a multi-tenant on-demand database system while maintaining access constraints amongst users associated with a common tenant.

In an embodiment, and by way of example, a method of providing perceivable stimuli in an interface of a multi-tenant on-demand database system includes receiving a request for access to a sub-portion of content on the database system, the request having requester identification data; identifying groups having access to the sub-portion; identifying member information associated with the groups; determining whether the requester identification data corresponds to the member information; and configuring an interface to provide perceivable stimuli to the requestor that corresponds to the sub-portion in response to the requester information corresponding to the member information, with the perceivable stimuli being defined by hysteretic data. Hysteretic data is information provided to the requester corresponding to the requester identification data based upon interactions with the information before the current access to the architecture by the requester.

The present invention is described with reference to an embodiment in which an apparatus provides perceivable stimuli in an interface of a multi-tenant on-demand database system. Although the invention is discussed with respect to supporting multiple tenants; the present invention is not limited to multi-tenant database systems. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods are provided to implement batch processing in a multi-tenant on-demand database system. As used herein, the term multi-tenant database system (MTS) refers to those systems in which various elements of hardware and software of the database system may be shared by a multiplicity of users. For example, a given application server may simultaneously process requests for a great number of customers, and a given database table may store rows for a potentially much greater number of customers. It will be appreciated that multitenancy in a database is not merely an extension of adding additional users, since such direct and obvious extensions quickly become unworkable as data type since data type, security, schema, sharing, intra/inter tenant and characteristics compound exponentially with linear increments of users. Rather, unique and heretofore unknown techniques in database management of the disclosed embodiments can provide the ability to house such disparate data types and characteristics while circumventing the exponential growth in complexity and related access delays, making multi-tenancy a newly obtainable and previously unknown reality.

Figure 1:
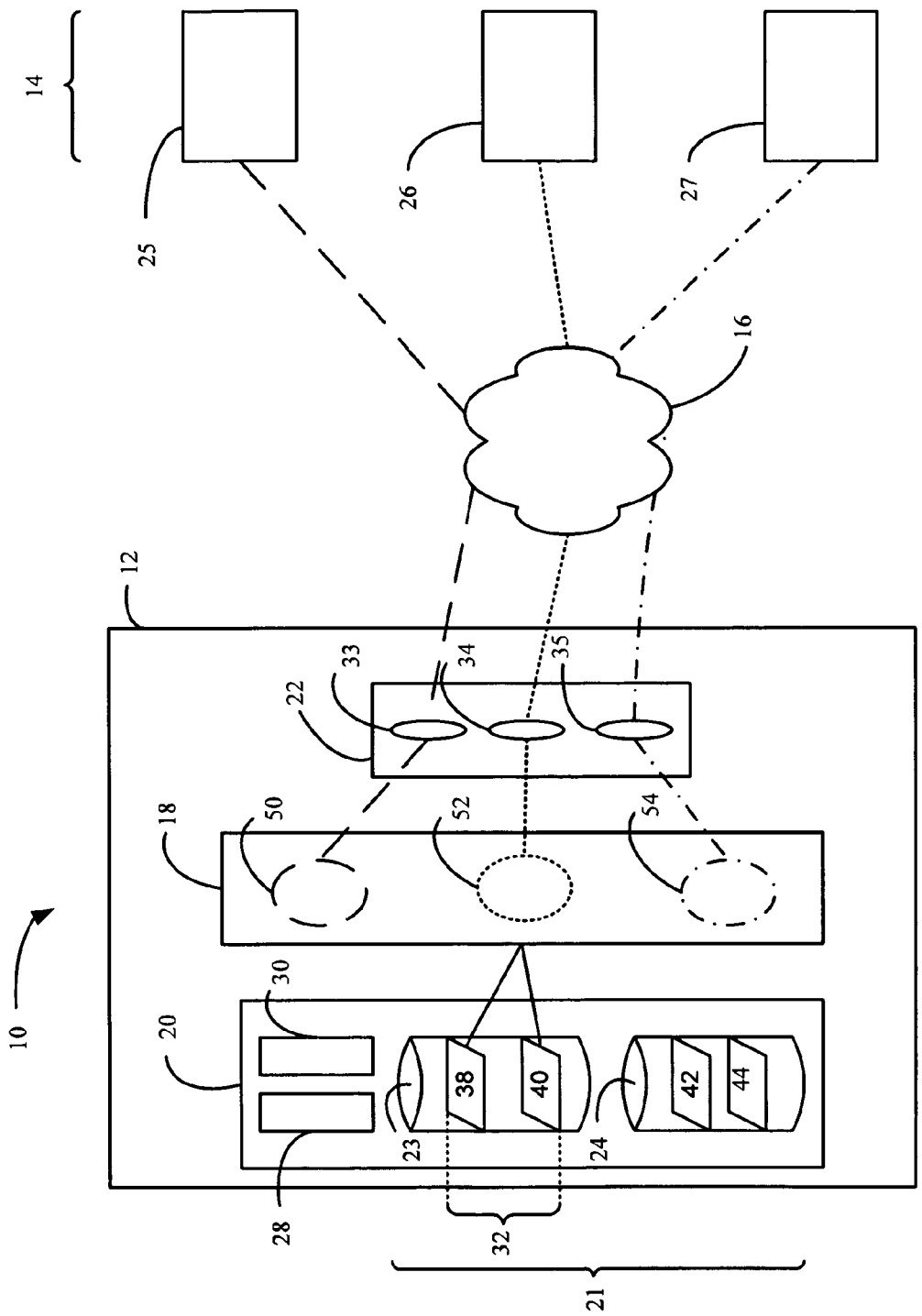
FIG. 1 illustrates a representative architecture of a multi-tenant database system in accordance with one embodiment of the present invention.

FIG. 1 illustrates a database architecture 10 that includes server side facilities 12 and client side facilities 14 in data communication over a network 16. Server side facilities 12 includes processor sub-system 18, memory space 20, in data communication therewith, and network interface resources 22 in data communication with both memory space 20 and processor sub-system 18. Processor sub-system 18 may be any known processor sub-system in the art, e.g., the CORE DUO® or the CORE 2 DUO® from Intel Corporation of Santa Clara, Calif. Memory space 20 includes drive storage 21, shown as one or more hard drives 23 and 24, as well as data and instruction registers, shown as 28, and volatile and non-volatile memory shown as 30. Data communication network 16 may be any network or combination of networks of devices that communicate with one another. Network 16 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet" with a capital "I," that network will be used in many of the examples herein. However, it should be understood that the networks that the present invention might use are not so limited, although TCP/IP is a frequently implemented protocol.

Server side facilities 12 provide access to a database 32 by multiple users 25-27 of client side facilities 14 over data communication network 16. To that end, network interface resources 22 include a plurality of virtual portals 33-35. Each virtual portal 33-35 provides an "instance" of a portal user interface coupled to allow access to database 32. Typically, tenants obtain rights to store information, referred to as tenant information 38 and 40, on database 32 and make the same accessible to one or more users 25-27 to whom the tenant provides authorization. This is typically achieved by rental agreements between the tenant and an owner/provider of architecture 10 and/or other tenants. In this manner, architecture 10 provides an on-demand database service to users 25-27 that are not necessarily concerned with building and/or maintaining the database system; rather, these functions are addressed between the tenant and the owner/provider.

With architecture 10, multiple users 25-27 may access database 32 through a common network address, in this example a universal resource locator (URL). In response, web-pages and/or other content may be provided to users 25-27 over network 16. The resources of database 32 that users 25-27 may access can be different, depending on user's 25-27 security or permission level and/or tenant association. As a result, data structures included in tenant information are managed so as to be allocated at the tenant level, while other data structures might be managed at the user level. Because architecture 10 supports multiple tenants including possible competitors, security protocols 42 and other system software 44, stored for example on hard drive 24, maintain applications and applications' use to only those users 25-27 with corresponding access rights. Also, because many tenants may desire access to architecture 10 rather than maintain their own system, redundancy, up-time, and backup are additional functions that may be implemented in architecture 10. In addition to user-specific data and tenant specific data, server side facilities 12 might also maintain system level data usable by multiple tenants, users, groups of users, other systems and/or other data. Such system level data might include industry reports, news, postings, and the like that are sharable among tenants.

For example, in certain embodiments architectures 10 may allow users 25-27 associated with one or more of the tenants, referred to as tenant users, access to a sub-portion of the content of the database information that the tenant may be allowed to access. The sub-portion that any one of users 25-27 may access may be the same as, or different from, the sub-portion that the remaining users 25-27 may access. Users 25-27 not associated with a tenant or otherwise not having permission to access data of the tenant, would not be allowed access to information 38 and 40. For example, assume users 25 and 26 are associated with the tenant corresponding to tenant information 38 and not associated with the tenant corresponding to tenant information 40. Users 25 and 26 would not be allowed access to tenant information 40 and would be allowed access to tenant information 38 or a sub-portion thereof. In the present example, user 25 may be allowed access to a first portion of tenant information 38 and user 26 may be allowed access to a second portion of tenant information 38, which is mutually exclusive. Similarly, were user 27 associated with the tenant corresponding to tenant information 40 and not the tenant corresponding to tenant information 38, user 27 would be allowed to access tenant information 40, or a portion thereof, and not tenant information 38. It is possible, however, that one of users 25-27 is associated with the tenants corresponding to both sets of tenant information 38 and 40.

Tenant information 38 and 40 may be viewed as a collection of objects, such as a set 61-66 of logical tables, containing data fitted into predefined categories. This is shown as data objects 67-73 with respect to tenant set 63. A "table" is one representation of a data object, and may be used herein to simplify the conceptual description of objects and custom objects according to the present invention. It should be understood that "table" and "object" may be used interchangeably herein.

Virtual portals 33, 34 and 35 facilitate providing resources of database 32 on behalf of a tenant to users 25-27 associated with the tenant. Each user 25-27 logs into one of virtual portals 33, 34 and 35 to access resources of database 32 through a unique uniform resource locator (URL) or other type of address. Based on the URL and other identifying information associated with users 25-27, architecture 10 may determine the resources of database 32 users 25-27 may access. For example, user 25 communicates with database through virtual portal 33, user 26 communicates with database 32 through virtual portal 34, and user 27 communicates with database through virtual portal 35. It is possible, however, that all users 25-27 may use a common portal, as well. To that end, users 25-27 desiring to access resources of database 32 employ virtual portals 33, 34 and 35 to validate against the information stored on architecture 10, corresponding to the user 25-27 requesting access to a sub-portion of content on database 32. The communications between users 25-27 and server side facilities 12 results in multiple processes 50, 52 and 54 being executed by processor sub-system 18. Thus, it is desired that processor sub-system 18 be capable of providing uninterrupted interaction with users 25-27.

Figure 2:
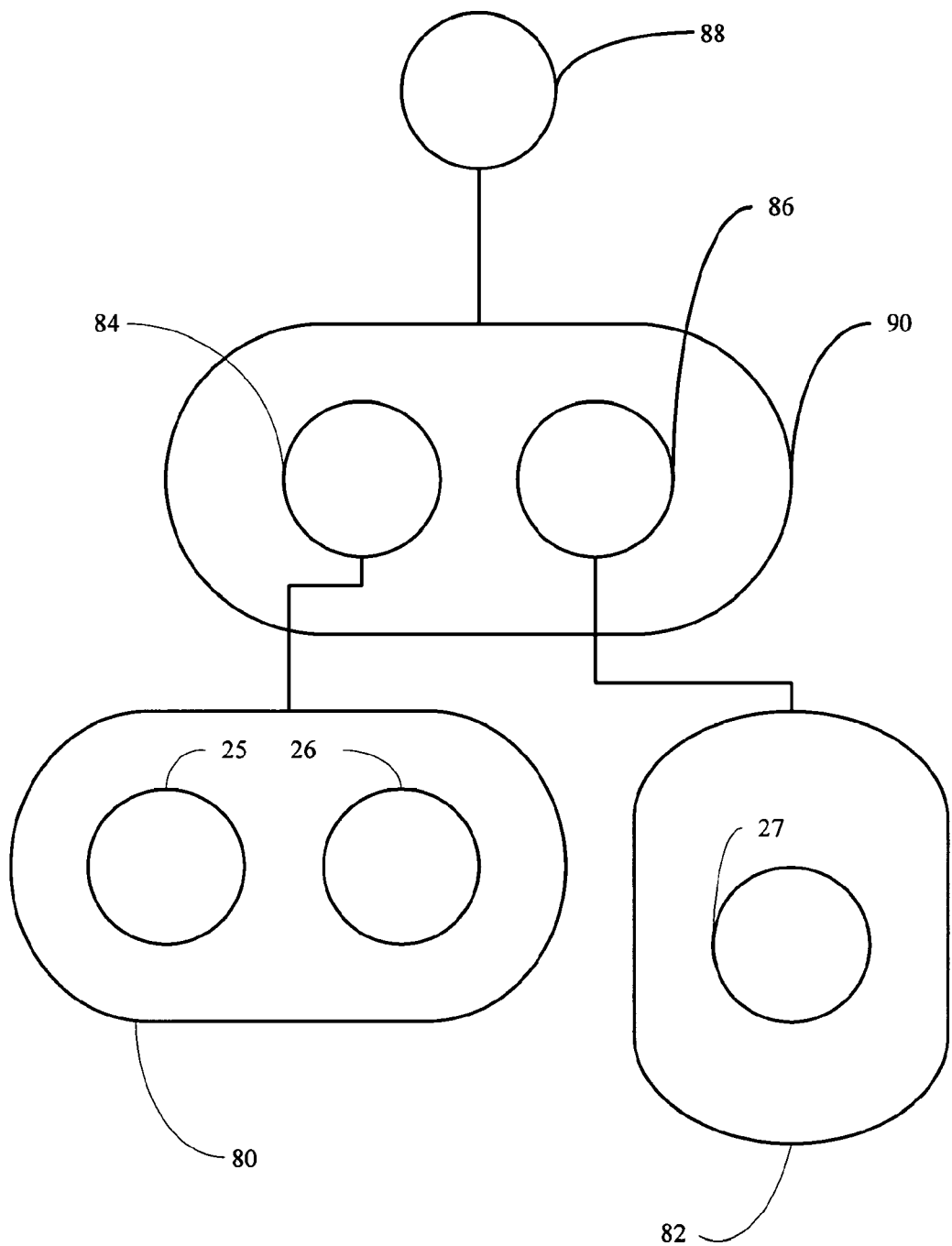
FIG. 2 is a simplified schematic view showing interrelationships between various groups and tenant representatives that have rights to access the multi-tenant database system, shown in FIG. 1, in accordance with the present invention.

Referring to both FIGS. 1 and 2, an example of a tenant may be a company that employs a sales force where each salesperson uses server side facilities 12 to manage their sales process, such as by a management representative of the tenant, e.g., Vice President of Sales, the Chief Executive Officer of the tenant and the like. In this fashion, architecture facilitates Customer Relations Management (CRM). Thus, one or more of users 25-27 may be a salesperson that maintains information applicable to that salesperson's sales process and may be different from information related to other salespersons' sales process. Although the sales force accessing database 32 is represented by three users 25-27, in practice hundreds of salespersons would access database 32. Moreover, sales process data of each sales person may include thousands of files. An example of sales process data may include, without limitation, contact data, leads data, customer follow-up data, performance data, goals and progress data applicable to that salesperson's personal sales process.

Moreover, to facilitate management of this information, the tenant associated with the salespersons may restrict each of the salespersons to access specific sales process information. However, a tenant, or representative thereof based upon a contractual relationship between the salesperson and the representative, may be able to view all sale process information for some or all of the salespersons associated with the tenant. An example of a contractual relationship is a managerial/supervisory relationship. The managerial relationship between the salesperson and the tenant representative may provide the representative with a higher permission level when compared to the permission level of the salesperson, because, inter alia, the tenant representative may be a manager/supervisor of the salesperson. Another contractual relationship may be the principle agent relationship wherein the tenant representative has no day-to-day management responsibility of the salesperson. Nonetheless, as the representative of the principle, e.g., the tenant, the representative may be permitted to view all or part of the salesperson information, because the salespersons may be deemed to be merely agents of the tenant.

It is desired, however, that certain information be conveyed between users of architecture 10 while maintaining the aforementioned restrictions on access to specific information. This information may be considered push-information. For example, it may be desired that a tenant, or tenant representative, transmit deterministic data in common to all users associated therewith upon each user 25-27 gaining access to architecture 10. An example of such information may include that which is related to a particular business cycle, e.g., quarterly reports, annual reports and the like. Additionally, the information transmitted to each user 25-27 may relate to the tenant, such as a change in the status of tenant, e.g., stock prices, ownership information, opening of a new store or some other news related item concerning the tenant. With this configuration, the deterministic data included in push-information may be that information to which access may not be gained through a request by one or more users, but only at the initiative of the tenant pushing the same to the users.

Referring to both FIGS. 1 and 2, additionally, the tenant or tenant representative may transmit to each of users 25-27 geographic specific information, e.g., information related to a county, state, country, region of the globe. For example, a number of salespersons may be located in a geographic location which may be considered a geographic sub-group, which is shown as sub-groups 80 and 82. Sub-group 80 includes users 25 and 26, and sub-group 82 includes user 27. Sub-group 80 may be in a geographic location that is considered separate and distinct from the geographic location in which sub-group 82 is located. A representative of tenant, user 84, may have a managerial relationship with respect to users 25 and 26 by virtue of the association with sub-group 80, e.g., user may be the Vice-President of Sales for the geographic region corresponding to sub-group 80. Similarly, a representative of tenant, user 86, has a managerial relationship with respect to user 27 by virtue of the association with sub-group 82, e.g., user may be the Vice-President of Sales for the geographic region corresponding to sub-group 82. In addition, it may be seen that an additional user 88 has a managerial relationship with respect to users 84 and 86. As a result of the relation of user 88 to users 84 and 86, users 84 and 86 may be viewed as an additional sub-group 90 of the tenant. In this arrangement, push information may be provided by user 88 to each of users 84 and 86. Some of a sub-portion of the push information provided to users 84 and 86 may be common, with the remaining portion of the push information being geographically specific. In this fashion, the geographic specific portion of the push information provided to user 84 would be different from the geographic specific portion of the push information provided to user 86. This would allow users 84 and 86 to provide or withhold the appropriate information to groups 80 and 82, respectively.

In addition to, or in lieu of, the geographic specific information, the push-information may include market-based information, e.g., users with similar types of products or services may obtain the same information, independent of the geographic location of the groups. An example of such information may concern legislation regulating the service/product, as well as sales trends, product liability, confidentiality, warranty information and the like. Push information may also include information based upon dynamically changing parameters, such as a users schedule, global positioning coordinates, electronic message routing, user input and/or other indicators that a salesperson is at a specific geographic location, such as a conference, public place, customer/competitor's location and the like. The dynamically changing parameters may be used to determine whether a particular user with receive certain information. Similarly, the push information may include information based upon members of a collaborative interaction independent of the geographic location of the members, as is the case with virtual meetings. The push information may include information related to the topic of the interaction, the members of the interaction the session of the interaction and the like. Additionally, a user may opt-out of receiving push information.

In addition to, or in lieu of, deterministic push-information provided by tenant or the tenant representative, push-information may include hysteretic data. Hysteretic data is information provided to one or more users 25-27 based upon interactions with the information before the current access to architecture 10 by the user 25-27. For example, a user 25-27 may have perceived the information in an earlier access of architecture 10. It could be that this information is provided to the same user upon subsequent accesses to architecture 10. In addition, or in lieu of the information being previously viewed by the accessing user, hysteretic data may be based upon other events, such as a threshold of other users viewing the information and having a logical relationship to the user currently accessing the architecture 10, e.g., users 25-27 being associated with a common geographic location, product/service market, customers/competitors, contract, agency, confidentiality and the like. In this manner, hysteretic data may be conveyed between users 25-27 of architecture 10 based upon earlier interactions with the information while maintaining the aforementioned restrictions on access to specific information. The push-information is provided to one or more of users 25-27 so as to be perceivable upon accessing database 32, discussed more fully below. As with deterministic data, push-information having hysteretic data is not necessarily available to a first user by requesting to access the same. Rather, it may be information that the first user is prohibited from accessing, except upon the occurrence of certain interactions with the data by a second user that has access to the same and a logical relationship with the first user, e.g., the first and second user being responsible for a common service and the first user perceiving the data for a requisite amount of time.

Figure 3:
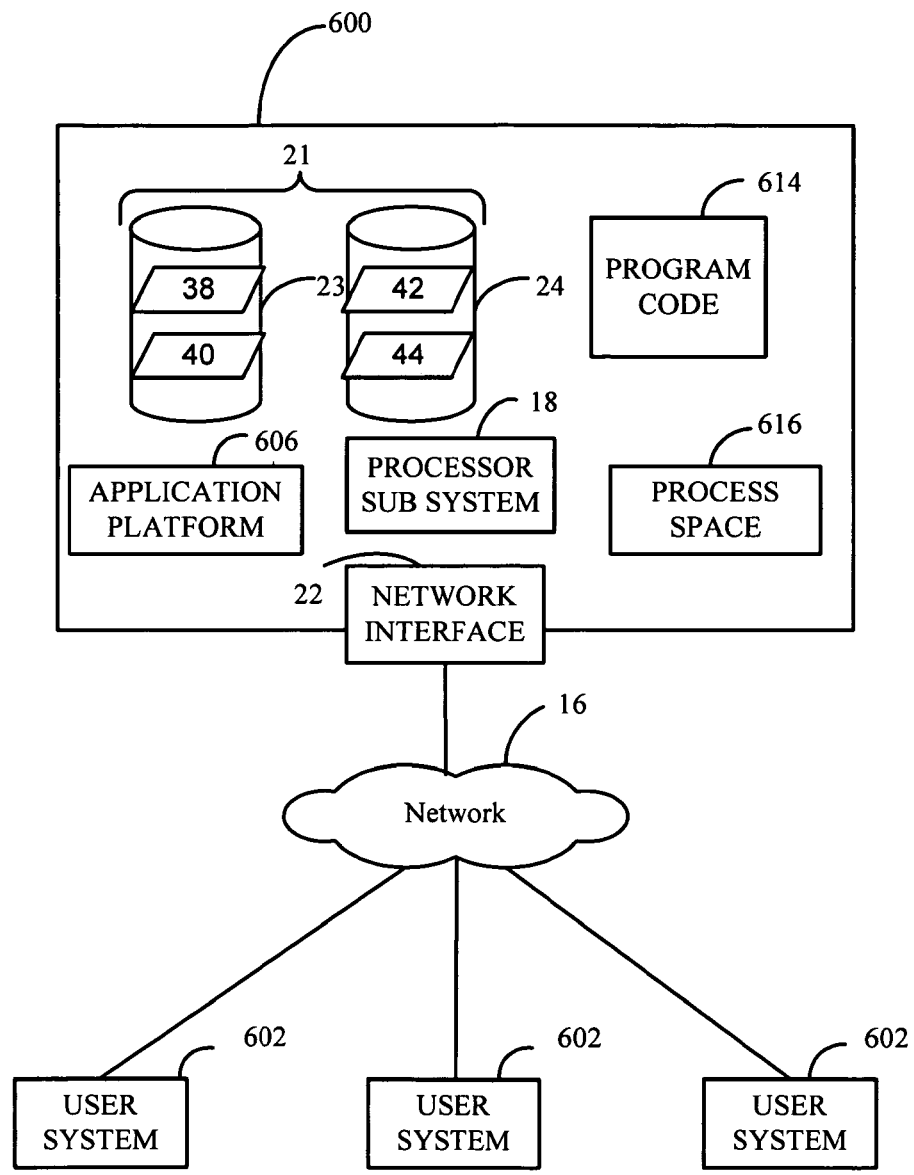
FIG. 3 illustrates a block diagram of an example of a representative system in which the architecture, shown in FIG. 1, may be practiced.

Referring to both FIGS. 1 and 3 a block diagram of a server system 600 employed to implement architecture 10 is shown as including multiple user systems 602 included in client side facilities 14 and in data communication with server system 600 over network 16. Server system 600 includes a processor sub-system 18, application platform 606, network interface 22, and drive storage 21 that includes database 32. In addition server system 600 includes program code 614, and process space 616. Program code 614 may include, among other code to facilitate a tenant establishing rules concerning the information that will be pushed to, or withheld from, users 25-27 when accessing database 32. Process space 616 facilitates execution of MTS system processes and tenant-specific processes, such as running applications as part of an application hosting service. Additional processes that may execute on server system 600 include database indexing processes. In other embodiments, server system 600 may not have all of the components listed and/or may have other elements instead of, or in addition to, those listed above. Server system 600, and additional instances of an MTS, where more than one is present, and all components thereof may be operator configurable using applications including computer code to run using a central processing unit such as processor sub-system 18.

Application platform 606 may be a framework that allows the applications of architecture 10 to run, such as the hardware and/or software, e.g., the operating system. In an embodiment, application platform 606 may enable creation, managing and executing one or more applications developed by the owner/provider of architecture 10, users 25-27 accessing architecture 10 via user systems 602, or third party application developers accessing architecture 10 via user systems 602.

In one embodiment, server system 600 implements a web-based customer relationship management (CRM) system. For example, server system 600 may include application servers (not shown) configured to implement and execute CRM software applications as well as provide related data, code, forms, webpages and other information to and from user systems 602 and to store to, and retrieve from, database system related data, objects, and Webpage content. Architecture 10 typically stores data for multiple tenants in the same physical database object, however, tenant data typically is arranged so that data of one tenant is kept logically separate from that of other tenants so that one tenant does not have access to another tenant's data, unless such data is expressly shared. In certain embodiments, server system 600 implements applications other than, or in addition to, the CRM application discussed above. For example, server system 600 may provide tenant access to multiple hosted (standard and custom) applications, including a CRM application. User (or third party developer) applications, which may or may not include CRM, may be supported by the application platform 606, which manages creation, storage of the applications into one or more database objects and executing of the applications in a virtual machine in the process space of server system 600.

Figure 4:
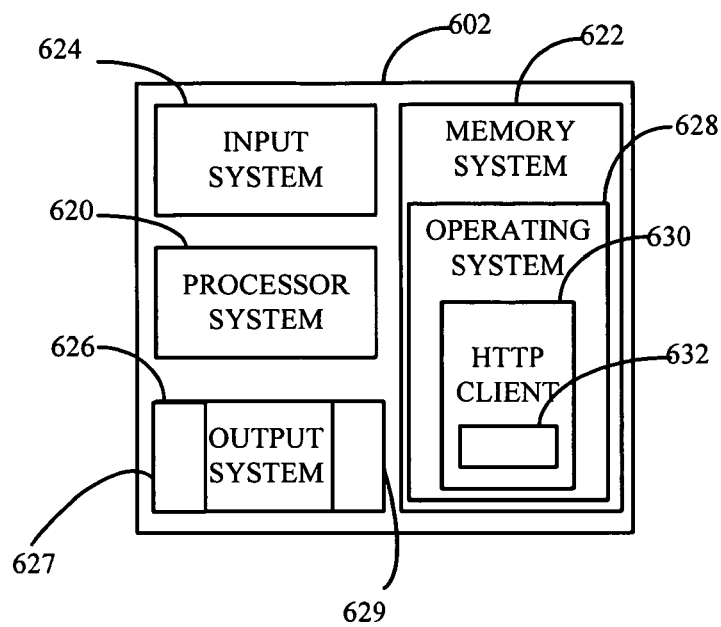
FIG. 4 is a detailed block diagram of a user system, shown in FIG. 3.

Referring to FIGS. 1, 3 and 4, to facilitate web-based CRM, user systems 602 might communicate with server system 600 using TCP/IP and, at a higher network level, use other common Internet protocols to communicate, such as HTTP, FTP, AFS, WAP, etc. To that end, user systems 602 may be any computing device capable of interfacing directly or indirectly to the Internet or other network connection, such as desktop personal computer, workstation, laptop, PDA, cell phone, or any wireless access protocol (WAP) enabled device and the like running an HTTP client 49. An example of a user system 602 includes a processor system 620, a memory system 622, an input system 624, and output system 626. Processor system 620 may be any combination of one or more processors. Memory system 622 may be any combination of one or more memory devices, volatile, and/or non-volatile memory. A portion of memory system is used to run operating system 628 in which HTTP client 630 executes. Input system 624 may be any combination of input devices, such as one or more keyboards, mice, trackballs, scanners, cameras, and/or interfaces to networks. Output system 626 may be any combination of output devices, such as one or more monitors 627, printers (not shown), speaker 629 and/or interfaces to networks. HTTP client 630 allows users 25-27 of users systems 602 to access, process and view information, pages and applications available to it from server system 600 over network 16. Examples of HTTP client 630 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 38 and 40 by entering the URL (not shown) into the URL box 632 of HTTP client 630. The URL directs users 25-27 to the appropriate virtual portal for to determine authorization and permission level to access the requisite tenant information.

Data corresponding with each user 25-27 may be separate from the data corresponding to the remaining users 25-27 regardless of the tenant associated with users 25-27; however, some data might be shared or accessible by predetermined groups of a plurality of users 25-27 or all of users 25-27 associated with a tenant, such as the aforementioned push information. Thus, there might be some data structures managed by server system 600 that are allocated at the tenant level while other data structures might be managed at the user level. Because an MTS typically support multiple tenants including possible competitors, various embodiments of the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, server system 600 might also maintain system level data usable by multiple tenants or other data. Such system level data might include industry reports, news, postings, and the like that are sharable among tenants.

According to one embodiment, server system 600 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
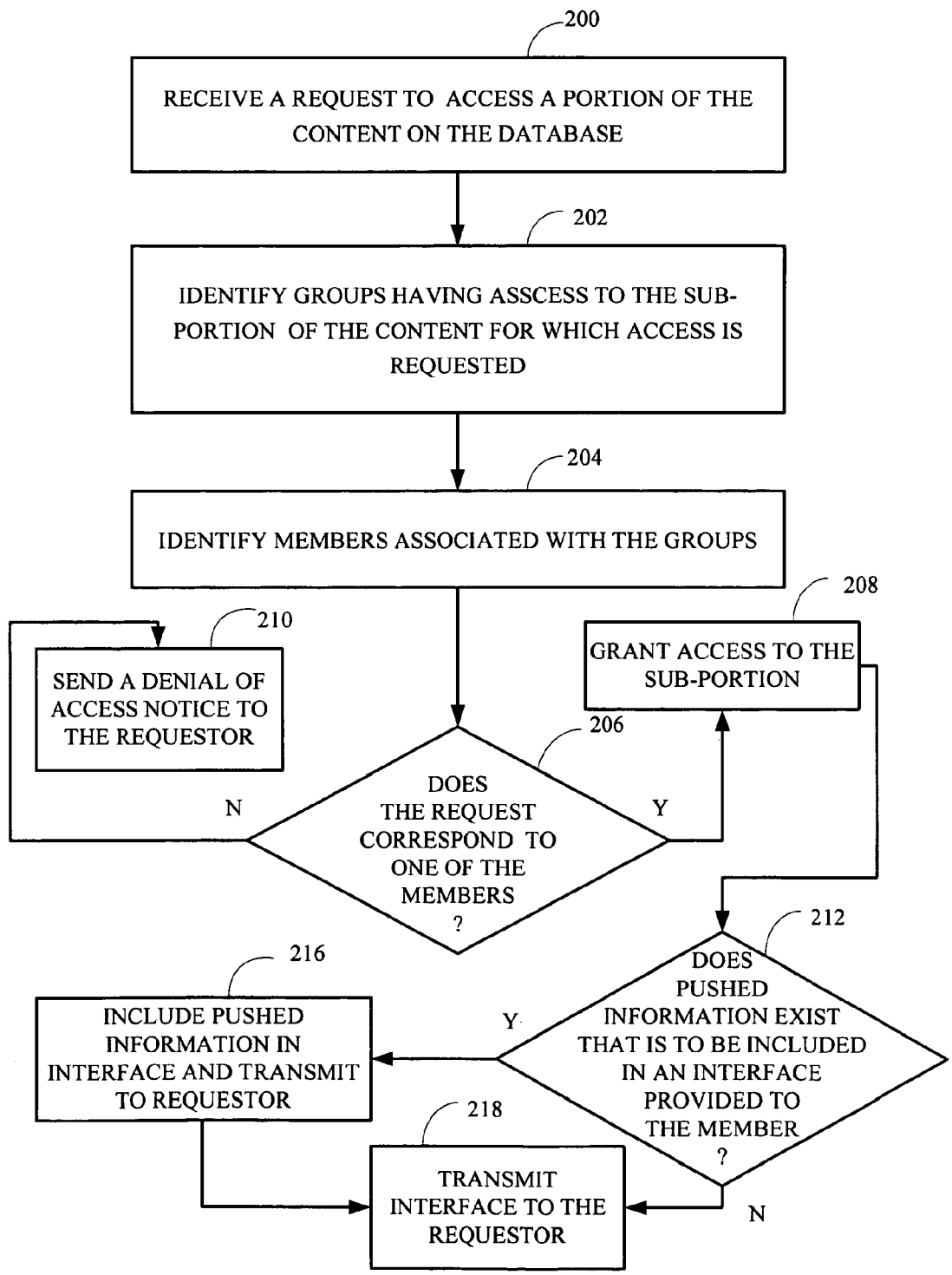
FIG. 5 is a flow diagram showing a method of updating a users interface in accordance with the present invention.

Referring to FIGS. 2, 3 and 5, in accordance with an embodiment operation of server system 600 receives a request for access to a sub-portion of content on server system 600 at step 200. The request includes requester identification data that corresponds to one of users 25-27 seeking access to server system 600. Program code 614 includes computer readable instructions that identify groups 80, 82 and 90 having access to the sub-portion of content of server system 600, e.g., database 38 at step 202. At step 204, computer readable instructions included in program code 614 identify member information associated with the groups 80, 82, and 90 to determine what members are associated therewith. At step 206, computer readable instructions included in program code 614 determine whether the requester identification data corresponds to the member information. If this is the case, then access is granted at step 208 by computer readable instructions included in program code 614. Otherwise, at step 210, computer readable instructions included in program code 614 send a message to the requester indicating that access is denied. Following step 208, computer readable instructions included in program code 614 determine whether there exists any pushed information that the user 25-27 associated with the requester identification is to perceive at step 212. If not, computer readable instructions included in program code 614 provide interface information to the user 25-27, at step 214. The information is then made perceivable to the user 25-27 using the appropriate subsystem of user system 602, e.g., monitor 627 and/or speakers 629. Otherwise, were it determined at step 212 that there was pushed information to be provided to the user 25-27, then at step 216 computer readable instructions included in program code 614 provide the push information with the interface information to be transmitted to the user 25-27.

Step 212 includes identifying one or more different categories, such as whether other members associated with the group to which users 25-27 belongs has previously perceived the information; whether other users 25-27 associated with the same is in a common geographic region or market has previously perceived the information. In addition, at step 212 computer readable instructions included in program code 614 may determine whether a periodic business cycle has completed that is associated with user 25-27 and provide the corresponding push information. Examples of such information include quarterly reports, yearly reports and the like.

Figure 6:
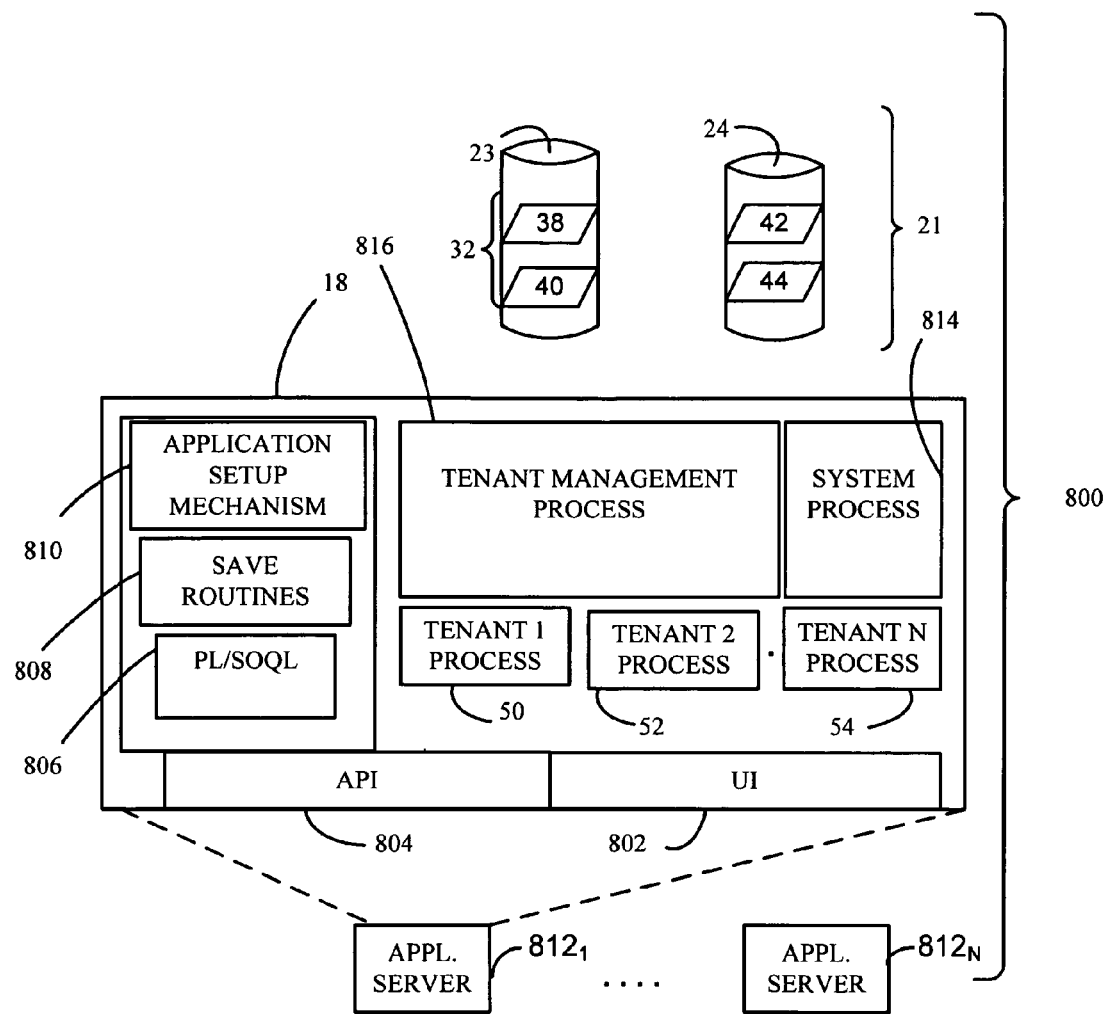
FIG. 6 illustrates a block diagram of an embodiment of elements of FIG. 3 and various possible interconnections between these elements.

Referring to FIG. 6, a specific embodiment of a server system 800 includes database 32, as discussed above, as well as processor sub-system 18 and a network interface 122. In addition, server system 800 includes a user interface (UI) 802, application program interface (API) 804, PL/SOQL 806, save routines 808, an application setup mechanism 810, applications servers $812_1$-$812_N$, system process space 814, tenant processes 50, 52 and 54, tenant management processes 816. User interface (UI) 802, application program interface (API) 804, PL/SOQL 806, save routines 808, an application setup mechanism 810, tenant processes 50, 52 and 54, tenant management processes 816 are shown as processes running in processor sub-system 18. However, it should be noted that the computer readable code to implement the processes may be stored on drive storage 31. In other embodiments, server system 800 may not have the same elements as those listed above and/or may have other elements instead of, or in addition to, those listed above. Network interface 122 is implemented as a plurality of HTTP application servers $812_1$-$812_N$.

Referring to FIGS. 1, 3 and 6, each application server $812_1$-$812_N$ may be configured to service requests of user systems 602 for access to database 32. In this configuration, tenant information 38 and 40 consists of different information storage areas that may different physical systems, e.g., different hard disks, and/or a logical separation of the information on a common system and may include application metadata for each user or groups of users. For example, a copy of a user's most recently used (MRU) items might be included. Similarly, a copy of MRU items for an entire organization that is a tenant might be stored. UI 802 provides a user interface and API 804 provides an application programmer interface to server system 800 resident processes to users and/or developers at user systems 602. The tenant data and the system data may be stored in various databases, such as one or more Oracle™ databases.

Referring again to FIGS. 1, 3 and 6, it is not necessary that the one or more HTTP application servers $812_1$-$812_N$ be implemented as the sole network interface between server system 800 and network 16. Rather, other communication techniques might be used in conjunction with HTTP application servers $812_1$-$812_N$ or in lieu thereof. In some implementations, the interface between server system 800 and network 16 includes load sharing functionality, such as round-robin HTTP request distributors to balance loads and distribute incoming HTTP requests evenly over a plurality of servers. At least as for users 25-27 one of HTTP application servers $812_1$-$812_N$, each of the plurality of servers has access to the MTS data; however, other alternative configurations may be used instead.

Application platform 606 includes an application setup mechanism 810 that supports application developers' creation and management of applications, which may be saved as metadata by save routines 808 for execution by subscribers as one or more tenant process spaces 84 managed by tenant management process 86, for example. Invocations to such applications may be coded using PL/SOQL 806 that provides a programming language style interface extension to API 804. A detailed description of some PL/SOQL language embodiments is discussed in commonly owned co-pending U.S. patent application Ser. No. 11/859,498 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata for the subscriber making the invocation and executing the metadata as an application in a virtual machine.

Each HTTP application servers $812_1$-$812_N$ may be communicably coupled to database systems, e.g., database 32, via a different network, connection. For example, one HTTP application server $812_k$ might be coupled via the network 16 (e.g., the Internet), another HTTP application servers $812_1$-$812_N$ might be coupled via a direct network link, and another one of HTTP application servers $812_1$-$812_N$ might be coupled by yet a different network connection. Transfer Control Protocol and Internet Protocol (TCP/IP) are typical protocols for communicating between HTTP application servers $812_1$-$812_N$ and database 32. However, it will be apparent to one skilled in the art that other transport protocols may be used to optimize the system depending on the network interconnect used.

In certain embodiments, each of HTTP application servers $812_1$-$812_N$ is configured to handle requests for any user associated with any organization that is a tenant. Because it is desirable to be able to add and remove application servers from the server pool at any time for any reason, there is preferably no server affinity for a user and/or organization to a specific one of HTTP application servers $812_1$-$812_N$. In one embodiment, therefore, an interface system implementing a load balancing function (e.g., an F5 Big-IP load balancer) is communicably coupled between HTTP application servers $812_1$-$812_N$ and the user systems 602 to distribute requests to HTTP application servers $812_1$-$812_N$. In one embodiment, the load balancer uses a least connections algorithm to route user requests to HTTP application servers $812_1$-$812_N$. Other examples of load balancing algorithms, such as round robin and observed response time, also can be used. For example, in certain, embodiments, three consecutive requests from the same user 25-27 could hit three different HTTP application servers $812_1$-$812_N$, and three requests from different user systems 602 could hit a common HTTP application server $812_1$-$812_N$. In this manner, server system 800 is multi-tenant, wherein server system 800 handles storage of, and access to, different objects, data and applications across disparate users and organizations.

In certain embodiments, user systems 602 (which may be client systems) communicate with HTTP application servers $812_1$-$812_N$ to request and update system-level and tenant-level data from server system 800 that may require sending one or more queries to database 32. Server system 800 (e.g., an application server 812 in server system 800) automatically generates one or more SQL statements (e.g., one or more SQL queries) that are designed to access the desired information. Database may generate query plans to access the requested data from the database.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, the present processes may be embodied as a computer program product that includes a machine-readable storage medium (media) having instructions stored thereon/in which can be used to program a computer to perform any of the processes of the embodiments described herein.

Computer code for operating and configuring the server system to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

What is claimed is:

1. A method operating at a hosting service architecture having at least a processor and a memory therein, wherein the method comprises:

receiving a request for access to a sub-portion of content stored at the hosting service, the request including requester identification data corresponding a user of the hosting service;

identifying one or more groups having access to the sub-portion of content;

indicating access is denied based upon a determination that the requester identification data lacks correspondence to the one or more groups having access to the sub-portion of content;

determining push information exists for the user associated with the requester identification data;

providing the push information to the user via a user interface, wherein the push information comprises information to which access is not attainable by request of the user and wherein the push information is not requested via a URL or TCP/IP interface by the user; and wherein the push information includes hysteretic data, the hysteretic data comprising information provided to the user corresponding to the requester identification data based upon interactions with the information before current access to the hosting service architecture is attained by the user.

2. The method of claim 1, wherein the push information includes information be conveyed between users of the hosting service architecture while maintaining restrictions on access by request to the information.

3. The method of claim 1:
wherein the hosting service architecture includes a multi-tenant database system;
wherein providing the push information includes providing deterministic data included with the push-information, the deterministic data including information to which access cannot be gained through a request by one or more users, but only pursuant to initiative of a tenant of the multi-tenant database system pushing the deterministic data to the one or more users.

4. The method of claim 3, wherein the deterministic data comprises one or more of:
information related to a particular business cycle;
quarterly reports;
annual reports;
information related to the tenant;
change in the status of the tenant;
stock prices;
ownership information;
opening of a new store; and
news item concerning the tenant.

5. The method of claim 1, wherein providing the push information includes providing geographic specific information specific to the user.

6. The method of claim 5, wherein providing geographic specific information specific to the user comprises at least one of:
providing the geographic specific information to a number of salespersons located in a geographic location; and
providing the geographic specific information to users in a geographic sub-group based on the users having a managerial relationship to a representative of the tenant due to the users' association with the geographic sub-group.

7. The method of claim 5, wherein providing geographic specific information specific to the user comprises providing first push information to the user based on a first geographic association and providing second push information to a second user based on a second geographic association, wherein a geographic portion of the first and second push information are different.

8. The method of claim 1, wherein providing the push information includes providing market-based information to users affiliated with similar products or services independent of a geographic location for the one or more groups.

9. The method of claim 1, wherein providing the push information includes providing information based on affiliation with a product or service, the information comprising one or more of:
legislation regulating the product or service;
sales trends for the product or service;
product liability information for the product or service;
confidentiality information regarding the product or service; and
warranty information regarding the product or service.

10. The method of claim 1:
wherein providing the push information includes providing information based upon dynamically changing parameters including one or more of: the user's schedule, global positioning coordinates, electronic message routing, user input, and information indicative that the user is at any of a specific geographic location, a conference, a public place, a customer's location, or a competitor's location; and
wherein the dynamically changing parameters determine whether any particular user will receive the push information.

11. The method of claim 1:
wherein determining the push information exists for the user is based upon whether the user is a member of a collaborative interaction or virtual meeting; and
wherein providing the push information includes providing information about a topic of the collaborative interaction or virtual meeting or members of the collaborative interaction or virtual meeting, or both.

12. The method of claim 1, further comprising:
receiving an opt-out from the user from receiving push information.

13. The method of claim 1,
wherein the hysteretic data is identified based on one or more of:
a threshold of other users viewing the information;
other users having a logical relationship to the user having made the request for access;
the user being associated with a common geographic location;
the user being associated with a product or a service;
the user being associated with particular customers or competitors;
the user being associated with a particular contract, agency;
the user being associated with a particular confidentiality agreement; and
wherein the hysteretic data is conveyed between users of the hosting service architecture based upon earlier interactions with the information while maintaining restrictions on access to the information by request.

14. The method of claim 1, wherein the user is prohibited from accessing the information except upon occurrence of certain prior interactions with the information by a second user having access to the information and further in which the second user has a logical relationship with the first user.

15. Non-transitory machine readable storage media having instructions stored thereupon that, when executed by a processor of a hosting service architecture, the instructions cause the hosting service architecture to perform operations including:
receiving a request for access to a sub-portion of content stored at the hosting service, the request including requester identification data corresponding a user of the hosting service;
identifying one or more groups having access to the sub-portion of content;
indicating access is denied based upon a determination that the requester identification data lacks correspondence to the one or more groups having access to the sub-portion of content;
determining push information exists for the user associated with the requester identification data;
providing the push information to the user via a user interface, wherein the push information comprises information to which access is not attainable by request of the user and wherein the push information is not requested via a URL or TCP/IP interface by the user; and
wherein the push information includes hysteretic data, the hysteretic data comprising information provided to the user corresponding to the requester identification data based upon interactions with the information before current access to the hosting service architecture is attained by the user.

16. The non-transitory machine readable storage media of claim 15, wherein the user is prohibited from accessing the information except upon occurrence of certain prior interactions with the information by a second user having access to the information and further in which the second user has a logical relationship with the first user.

17. The non-transitory machine readable storage media of claim 15:
wherein the hosting service architecture includes a multi-tenant database system;
wherein providing the push information includes providing deterministic data included with the push-information, the deterministic data including information to which access cannot be gained through a request by one or more users, but only pursuant to initiative of a tenant of the multi-tenant database system pushing the deterministic data to the one or more users.

18. A hosting service architecture, comprising:
a processor sub-system;
a memory space;
a multi-tenant database system having content stored thereupon on behalf of a plurality of tenants;
an interface to receive a request for access to a sub-portion of content stored at the hosting service, the request including requester identification data corresponding a user of the hosting service;
program code to identify one or more groups having access to the sub-portion of content;
the program code indicating access is denied based upon a determination that the requester identification data lacks correspondence to the one or more groups having access to the sub-portion of content;
the program code to further determine push information exists for the user associated with the requester identification data;
the program code to further provide the push information to the user via a user interface, wherein the push information comprises information to which access is not attainable by request of the user and wherein the push information is not requested via a URL or TCP/IP interface by the user; and
wherein the push information includes hysteretic data, the hysteretic data comprising information provided to the user corresponding to the requester identification data based upon interactions with the information before current access to the hosting service architecture is attained by the user.

19. The hosting service architecture of claim 18, wherein the user is prohibited from accessing the information except upon occurrence of certain prior interactions with the information by a second user having access to the information and further in which the second user has a logical relationship with the first user.

20. The hosting service architecture of claim 18:
wherein providing the push information includes providing deterministic data included with the push-information, the deterministic data including information to which access cannot be gained through a request by one or more users, but only pursuant to initiative of a tenant of the multi-tenant database system pushing the deterministic data to the one or more users.

\* \* \* \* \*